US006527176B2

(12) United States Patent
Baric (10) Patent No.: US 6,527,176 B2
(45) Date of Patent: *Mar. 4, 2003

(54) COLLECTIVE PAYMENT AND CONTROL SYSTEM (76) Inventor: Robert Baric, 1973 High House Rd., Cary, NC (US) 27513

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/541,029

(22) Filed: Mar. 31, 2000

(65) Prior Publication Data

US 2002/0084322 A1 Jul. 4, 2002

(51) Int. Cl.$^7$ .................................................. G06F 7/08
(52) U.S. Cl. ........................ 235/381; 235/375; 235/378; 235/380; 235/385; 235/383
(58) Field of Search ................................ 235/381, 376, 235/379, 383, 385

(56) References Cited

U.S. PATENT DOCUMENTS

| 4,111,282 A | 9/1978 | Vayda, Jr. ........................ 186/1 |
| 4,169,521 A | 10/1979 | Vayda, Jr. ........................ 186/1 |
| 4,189,031 A | 2/1980 | Vayda, Jr. ........................ 186/1 |
| 4,805,738 A | 2/1989 | Vayda ........................... 186/36 |
| 5,113,974 A | 5/1992 | Vayda ........................... 186/136 |
| 5,270,943 A | 12/1993 | Warn ........................... 364/479 |
| 5,586,686 A | 12/1996 | Bustos et al. ................. 221/211 |
| 5,619,024 A | 4/1997 | Kolls ........................... 235/381 |
| 5,637,845 A | 6/1997 | Kolls ........................... 235/381 |
| 5,725,124 A | 3/1998 | Bustos et al. ................. 221/211 |
| 5,734,150 A | 3/1998 | Brown et al. ................. 235/381 |
| 5,753,899 A | 5/1998 | Gomm et al. ................. 235/381 |
| 5,798,931 A | 8/1998 | Kaehler ................... 364/479.01 |
| 5,816,443 A | 10/1998 | Bustos |
| 6,073,840 A | * 6/2000 | Marion ......................... 235/381 |
| 6,116,505 A | * 9/2000 | Withrow ....................... 235/381 |
| 6,176,421 B1 | * 1/2001 | Royal, Jr. et al. ............ 235/381 |
| 6,193,154 B1 | * 2/2001 | Phillips et al. ............... 235/381 |
| 6,213,393 B1 | * 4/2001 | Streicher et al. ............. 235/381 |
| 6,321,985 B1 | * 11/2001 | Kolls ........................... 235/381 |

* cited by examiner

*Primary Examiner*—Michael G. Lee
*Assistant Examiner*—Ahshik Kim
(74) *Attorney, Agent, or Firm*—Blank Rome Comiskey & McCauley (57) ABSTRACT A collective payment and control system has a variety of self-service devices that dispense different types of goods. The system has a primary dispenser such as a self-service fuel pump and a secondary dispenser such as a self-service vending machine. A customer enters a charge card into one of the dispensers, usually the primary dispenser. Once the card is validated, the primary dispenser together with secondary dispenser(s) associated with the primary dispenser, are activated. Products that are available to purchase from either the primary dispenser or the associated secondary dispensers are displayed to the customer at the primary and/or secondary dispenser. The customer then selects any of the displayed products either directly from the primary dispenser or from each of the primary and/or secondary dispensers. The cost for the selected products are then totaled by the primary dispenser and a single payment transaction is made, such as by a credit/debit charge. Alternatively, the cost can be totaled by a separate controller interface. A timeout feature is provided, and the system also allows for remote inventory assessment and pricing. The inventory assessment or stocking request can be transmitted to a remotely-located central facility.

37 Claims, 5 Drawing Sheets

COLLECTIVE PAYMENT AND CONTROL SYSTEM

BACKGROUND OF THE INVENTION

1. Field of the Invention

The present invention relates to a system and method for collective payment and control of multiple different types of self-service dispensers, and more particularly to a system that integrates payment and control of a fuel pump and vending machine.

2. Description of the Related Art

As used herein, the term "charge card" includes credit cards, debit cards and any equivalent payment card or device. Charge cards can be used to pay for a wide variety of goods and services. Self-service systems now permit customers to purchase a wide variety of goods without assistance from an attendant. Self-service fueling stations, for instance, provide a card reader at the fuel pump that authorizes fuel to be dispensed.

A customer can dispense the fuel and make payment directly at the pump, without having to enter a store or otherwise interact with an attendant. In addition, as shown in U.S. Pat. No. 5,734,150 to Brown and U.S. Pat. No. 5,753,899 to Gomm incorporated herein by reference, vending machines can be configured to accept payment from a smart card.

However, these prior self-service systems operate independent of one another. Consequently, a customer must pay for goods obtained from these self-service systems separately. Typically, there is a high cost associated with the charge card for each transaction, so that using charge cards to make a small-valued purchase is usually not financially feasible for the storeowner.

It is also an inconvenience for the customer to make a separate charge card transaction for a small-valued product, or to make multiple charge card transactions to purchase multiple goods or services at a same location. Yet, when the small-valued purchase is coupled with a larger ticket purchase such as a gasoline purchase, the transaction becomes not only feasible but highly profitable.

SUMMARY OF THE INVENTION

Accordingly, it is a primary object of the invention to provide a collective payment system that integrates payment from multiple different self-service systems. It is a further object of the invention to provide a collective control system that integrates control of multiple different self-service systems. It is another object of the invention to provide a collective payment and control system, and especially to integrate payment and control of a fuel dispenser and a vending machine dispenser. It is yet another object of the invention to locate multiple self-service systems adjacent one another in order to promote sales, especially between a small-valued goods dispenser and a larger-valued goods dispenser.

It is yet another object of the invention to provide collective payment and control system for use at a self-service service station that is not staffed. It is still a further object of the invention to provide a collective payment and control system that monitors inventory of dispensers, facilitates restocking, and enables remote and automatic control of pricing of goods.

In accordance with these objectives, the present invention integrates a variety of self-service devices that dispense different types of goods. Preferably, the system includes a primary dispenser comprising a self-service fuel pump and a secondary dispenser comprising a self-service vending machine.

As used herein, the primary dispenser is typically associated with large-valued goods and is likely to be the dispenser most frequently used in the system. The secondary dispenser, on the other hand, usually dispenses small-valued goods. However, the primary dispenser can be any suitable dispenser and need not be the most frequently used dispenser of the system or associated with a higher priced product.

The customer enters a charge card into one of the dispensers, usually the primary dispenser, which validates the card. If cash is used, a prepayment is received. Once the card is validated, the primary dispenser together with secondary dispenser(s) associated with the primary dispenser, are activated. Products that are available to purchase from either the primary dispenser or the associated secondary dispensers are displayed to the customer at the primary and/or secondary dispenser. The customer may then select any of the displayed products either directly from the primary dispenser or from each of the primary and/or secondary dispensers.

The cost for the selected products are then totaled by the processor of the primary dispenser and a single payment transaction is made, such as by a credit/debit charge or change for the initial cash payment. Alternatively, the cost can be totaled by a separate controller interface which functions as an integrator by accumulating subtotals from each primary and secondary dispenser.

A timeout feature is provided, such that the primary or secondary dispenser will close out if a selection is not made within a predetermined time of the card being validated or from selection of product from another dispenser. In addition, when the primary or secondary dispenser transaction is completed, the other respective dispenser is timed out.

The system also allows for remote inventory assessment. When inventory is reduced, and there will be a delay in restocking, the price can be automatically or remotely adjusted accordingly. This price adjustment maximizes the price per unit charged. The inventory assessment or stocking request can also be transmitted to a remotely-located central facility.

These together with other objects and advantages will become subsequently apparent as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing preferred embodiments of the invention illustrated in the drawings, specific terminology will be resorted to for the sake of clarity. However, the invention is not intended to be limited to the specific terms so selected, and it is to be understood that each specific term includes all equivalents.

Figure 1:
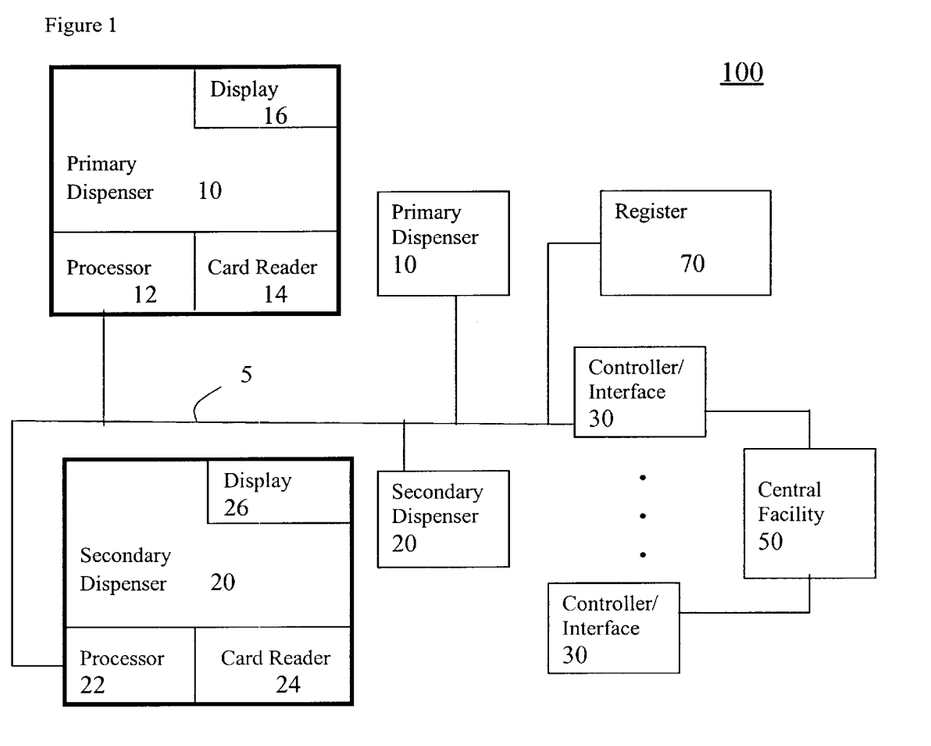
FIG. 1 is a block diagram of the collective payment and control system in accordance with the preferred embodiment of the invention.

Referring now to the drawings, FIG. 1 shows an overview of the payment and control system 100 generally having primary dispensers 10, secondary dispensers 20, controller/interface 30 and a central facility 50. The dispensers 10, 20 can be any suitable single- or multi-product device, though preferably the primary dispenser 10 is a fuel pump and the secondary dispenser 20 is a vending machine.

Each of the dispensers 10, 20 preferably has a processor 12, 22, card reader 14, 24 and a display 16, 26. The processor 12, 22, card reader 14, 24 and display 16, 26 are only shown in a single dispenser 10, 20 of FIG. 1 for ease of illustration. However, it should be understood that each dispenser 10, 20 of FIGS. 2–4 also contain a processor 12, 22, card reader 14, 24 and display 16, 26.

Processors 12, 22 control operation of the dispensers 10, 20, card readers 14, 24 and displays 16, 26. The dispensers 10, 20 are electrically connected to the controller/interface 30 so that processors 12, 22 can communicate with the central facility 50 via controller/interface 30. The connection can be a wired or wireless connection, and by a dedicated line or via a local network or global network such as the Internet.

The dispensers 10, 20 and the interface 30 are preferably located at a local facility, such as a gas station, and the central facility is located at a remote location and connected to a plurality of controllers 30. A regional facility (not shown) can optionally be provided between the central facility 50 and the controllers 30 which provide more of a localized operation of the local stations.

As shown in FIG. 1, each of the dispensers 10, 20 are connected to a main communication line 5. In the alternative preferred embodiment of FIG. 2, a secondary dispenser 20 is connected to one or more of the primary dispensers 10, which in turn are connected to the controller/interface 30. Here, the secondary dispenser 20 receives and transmits information and control signals via the primary dispenser 10. Still another alternative embodiment is shown in FIG. 3, wherein the interface is integrated into the primary dispensers 10, which are connected to the central facility 50. Thus, a single controller/interface is provided for each primary dispenser 10.

Figure 2:
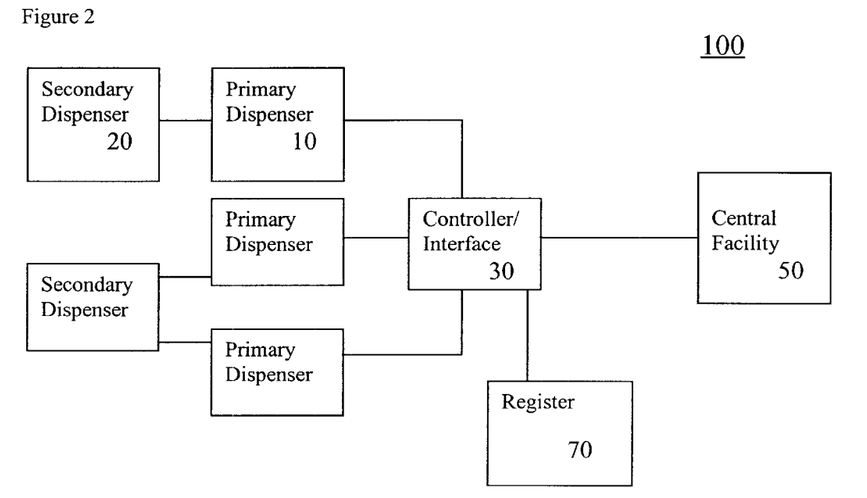
FIG. 2 is a block diagram of the system in accordance with an alternative embodiment.
Figure 3:
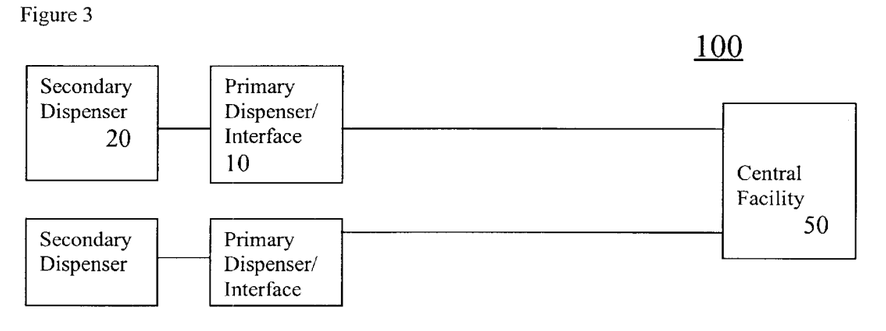
FIG. 3 is a block diagram of another alternative embodiment of the invention.

In FIGS. 2 and 3, each primary dispenser 10 is associated with a secondary dispenser 20, whereas in FIG. 1 any primary dispenser 10 can operate with any secondary dispenser 20. In the preferred embodiment, the primary dispenser 10 is a fuel pump and the secondary dispenser 20 is a vending machine. As illustrated in FIG. 2, each secondary dispenser 20 can be associated with more than one primary dispenser 10. Likewise, each primary dispenser 10 can be associated with more than one secondary dispenser 20. The different embodiments of FIGS. 1–3 can also be integrated in any suitable manner, as best illustrated for instance in FIG. 4.

Each processor 12, 22 controls a dispensing process and other operation of each of the respective dispenser 10, 20 and transfer data and control signals to and from the central facility 50 via controller/interface 30. The controller/interface 30 can be configured to operate simply as an interface that transfers signals between the dispensers 10, 20 and the central facility 50.

In this manner, the controller 30 coordinates control signals received from the central facility 50 and transmits the control signals to the dispensers 10, 20. The controller 30 also receives and coordinates data signals from the dispensers 10, 20 and forwards those data signals to the central facility 50. This is particularly advantageous when the primary dispenser 10 operates according to a different protocol than the secondary dispenser 20 or the central facility 50.

Figure 4:
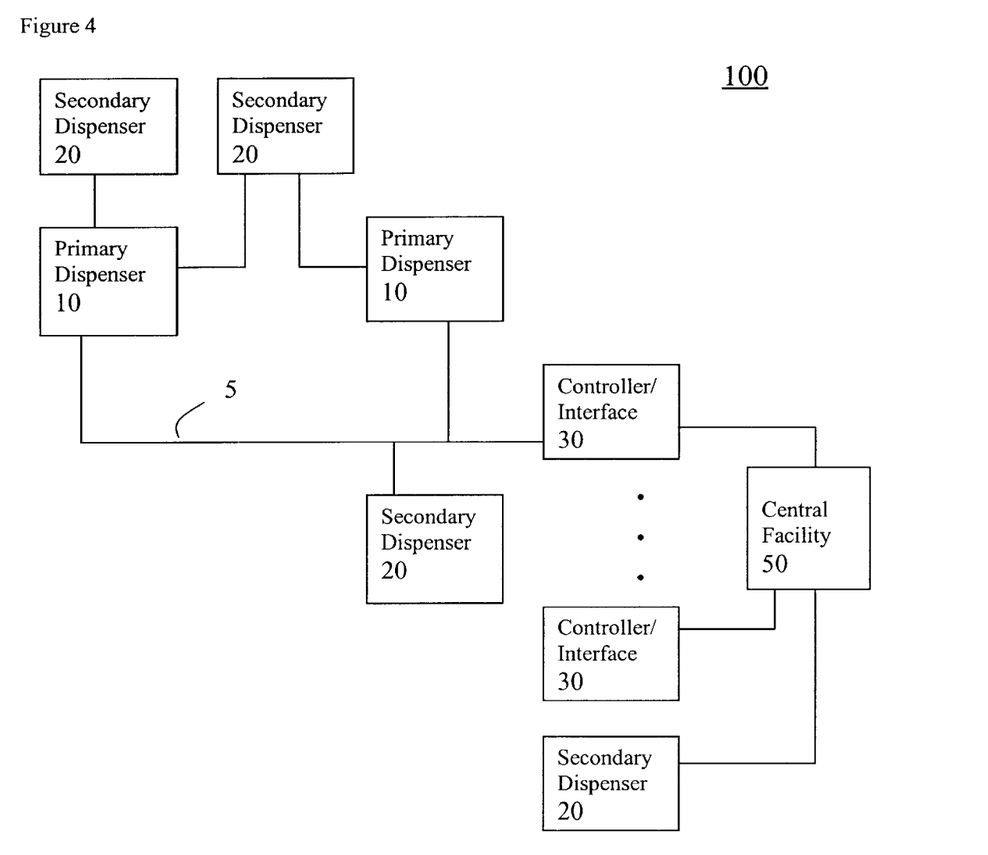
FIG. 4 is a block diagram including the various embodiments of FIGS. 1–3.

The controller/interface 30 can also be used to allow an attendant to control the dispensers 10, 20 located at the local station and to send data signals to the central facility 50. However, the controller 30 can also be eliminated, as shown in FIGS. 3–4, so that the dispensers 10, 20 communicate directly with the regional facility or central facility 50.

As further shown in FIGS. 1–2, a register station 70 can alternatively be provided for use by an attendant. The register station 70 can be used where the customer decides to make payment by cash, for inside payment, or purchases products located indoors. Sub-totals from the primary and secondary dispensers are transmitted to the register station 70. The register station 70 determines a final total, taking into account any additional products ordered through the register station 70. The attendant can then accept final payment for all products and services purchased by the customer. The station 70 can also be configured as a payment station 70 that is self-service, and accepts payment from the customer.

Figure 5:
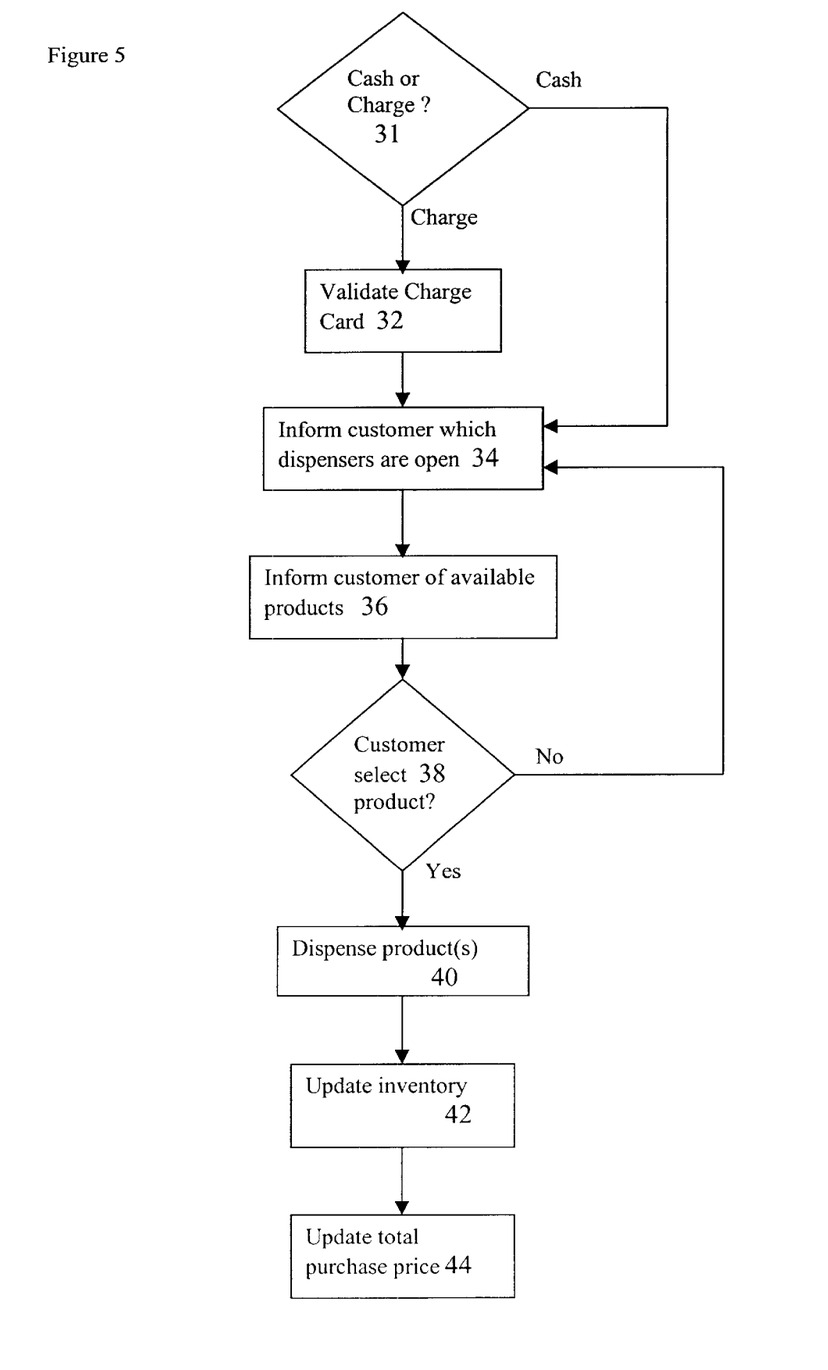
FIG. 5 is a flow chart of the operation of the dispenser of the invention.

Operation of the processor 12, 22 is shown in FIG. 5, which begins by validating a charge card at step 32 via the card reader 12, 22. For illustrative purposes, the following description will take the example in which a customer uses the card reader 14 of the primary dispenser 10. However, operation can also be at the secondary dispenser 20.

Starting at step 31, the system determines whether the customer will make payment by cash or credit. If a charge card is to be used, the card is validated at step 32. Once the card is validated by the card reader 14, all of the secondary dispensers 20 associated with the primary dispenser 10 are made available for use by the customer. Information is transmitted to the displays 16, 26 to inform the customer that certain dispensers 10, 20 are available for use by the customer, step 34.

If cash is used at step 31, the system proceeds directly to step 34. The cash is preferably received in advance of dispensing any product. Optionally, however, the system can allow the user to defer payment until after the goods and/or services are dispensed. Thus, for instance, the user can select to make payment by cash at an inside attendant after the product is dispensed. The totals from each of the primary and secondary dispensers would then be forwarded to the register 70, which can be either attendant-operated or self-service.

Continuing to step 36, information about the products available to the customer is displayed on one or more of the display devices 16, 26 of the associated dispensers 10, 20. The display device 16, 26 is used to indicate sale items, instructions, advertisements, promotional materials or the like. At step 38, the customer selects one or more of the products through a touch-sensitive display 16, 26 or a separate keypad (not shown).

Once a product is selected, step 38, the product is dispensed from the appropriate dispenser 10, 20. If the secondary dispenser 20 is to dispense product, the primary dispenser 10 transmits a control signal to the appropriate dispenser 20, causing that dispenser 20 to dispense the product, step 40.

Thus, product from secondary dispenser 20 can be selected from the display 16 of the primary dispenser 10. Alternatively, product from the secondary dispenser 20 can be selected directly from the secondary dispenser 20, which is automatically activated in response to the charge card being validated at step 32.

However, the secondary dispenser 20 can only be activated by one primary dispenser 10 at a time. If the secondary dispenser 20 is in use by another primary dispenser 10 or by a customer that is using cash/coins, that primary dispenser 10 indicates that the secondary dispenser 20 is in use and the customer must wait until the secondary dispenser 20 is closed out. Certain primary dispensers 10 can be assigned priority of use to certain secondary dispensers 20 based, for instance, upon proximity and/or orientation of the dispensers 10, 20 to one another.

Once the product has been dispensed, step 40, the inventory for that dispenser 10, 20 is updated, step 42. The status of the dispenser 10, 20 is also transmitted to the controller 30. Central facility 50 can poll each of the controllers 30 and/or dispensers 10, 20 to determine current inventory and how much additional product is needed. In addition, the controller 30 or dispenser 10, 20 can send an alert signal to the central facility 50 to indicate that additional supplies are needed.

Controller 30 can also be configured to collect additional information about each dispenser 10, 20, such as the volume of sales for a given period of time, whether the dispenser 10, 20 is presently in use, and whether the dispenser 10, 20 is fully operational or needs repair. Controllers 30 or central facility 50 can also change pricing at the dispensers 10, 20, as well as the information that is displayed on the dispenser 10, 20. Pricing can automatically be set based upon supply and demand information, or based upon when a next delivery can be made. Pricing can also be set by the dispensers 10, 20.

Once the product has been dispensed, step 40, the primary dispenser 10 is closed out. After all of the associated secondary dispensers 20 are closed out, the total price for all products purchased is calculated, step 44. If the customer uses the interactive display 16 of the primary dispenser 10 to order product from the secondary dispenser 20, the price is known by the primary dispenser 10 and is combined with the price of the fuel.

On the other hand, if the customer uses the interactive display 26 to order product from the secondary dispenser 20, the price must first be transmitted from the secondary dispenser 20 to the primary dispenser 10 where it is combined with the price of the fuel. As noted above, the total can alternatively be determined by controller 30. In this case, the primary and secondary dispensers transmit the subtotal to the controller 30. The controller 30 then determines and forwards the total price to the primary dispenser 10. Once the total price is determined, the customer's charge card is billed and a receipt can be printed at the primary dispenser 10.

Alternatively, the sub-total prices from each primary and secondary dispenser 10, 20 can be transmitted to the attendant station 70. The attendant station 70 determines the total price and receives payment. The attendant station 70 can also be provided with a manual override to timeout any dispensers 10, 20 that are still open. The station 70 can also be operated by an attendant, or can also be self-service. The station 70 also has a display and can control operation of the primary and secondary dispensers 10, 20.

Figure 6:
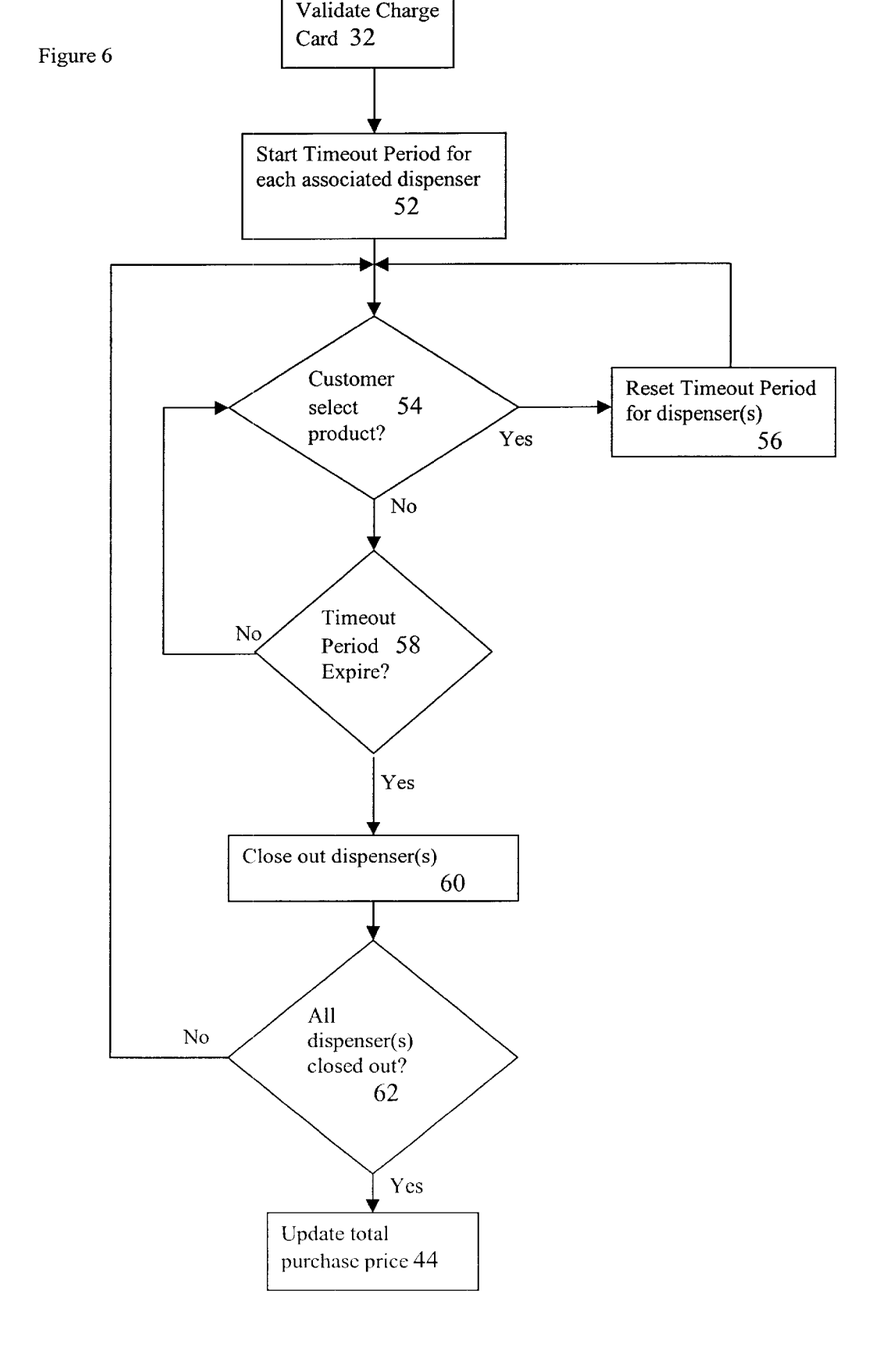
FIG. 6 is a flow chart showing the timeout feature of the present invention.

Turning to FIG. 6, the timeout period will now be discussed in further detail.

Upon validation of the charge card, step 32, the timeout period begins, step 52. If the customer is using cash, the timeout period can begin at the time the customer indicates cash will be used, or upon receipt of prepayment of cash. At block 54, the primary dispenser 10 waits for the customer to make a product selection.

Once a selection is made, the timeout period is reset, step 56, for the primary dispenser 10 and the associated secondary dispensers 20, or only for the dispenser that contained the selected product. If the dispensing operation takes an extended period of time, such as for dispensing fuel, the timeout period for that dispenser is preferably set to expire once the dispensing operation is complete. An extended period of time can also be added following completion of the dispensing operation.

The processor determines whether the timeout period has expired, step 58, until such time as a selection is made, step 54. If no selection is made at step 54 and the timeout period expires, step 58, the dispenser(s) is closed out, step 60.

At this point, a secondary dispenser 20 that has been closed out becomes available for use by cash or by other primary dispensers 10. Once the charge card is validated at the primary dispenser 10, the secondary dispensers 20 associated with the primary dispenser 10 are automatically reserved. After a secondary dispenser 20 is closed out, that dispenser 20 becomes available for use by another dispenser 10 or by cash/coin.

On the other hand, if the primary dispenser 10 closes out, and the secondary dispenser 20 has not timed out, the primary dispenser 10 waits for the secondary dispenser 20 to close, step 62, before determining the total purchase price, step 44. Optionally, the system may be configured so that the secondary dispenser 20 automatically times out once the primary device times out or finishes dispensing product. Still yet, the timeout period for the secondary dispenser 20 can start upon the primary dispenser 10 being closed. Regardless, once all of the dispensers 10, 20 are closed out, step 62, the total purchase price is determined, step 44.

Thus, for instance, if the customer chooses to select to dispense fuel from fuel pump 10, the primary dispenser 10 remains open until the product is dispensed. The vending machine 20, on the other hand, would close out after a predetermined timeout period. The timeout period is preferably measured from the moment the card is validated, step 52.

However, the timeout period for the secondary dispenser 20 can also be measured from the time the fuel is selected, or when the fuel transaction is completed. Thus, for instance, once the customer selects to dispense fuel, the consumer is informed that "Please make your selection from the vending machine. The vending machine will close in 30 seconds." In addition, the customer has the option of closing out one or all of the dispensers.

Control and data signals are formatted in accordance with common protocols, such as the vending machine communication protocol Multi-Drop Bus/Internal (MDBI) communication protocol. Of course, more than one protocol can be used. The system 100 is particularly useful to integrate different dispensers 10, 20 that each use different protocols or machine languages. Signals can be transmitted directly between the primary dispenser 10 and the secondary dispenser 20, or through the controller 30.

The present system 100 integrates self-service devices of the primary and secondary dispensers 10, 20. Only one payment or credit transaction is needed to purchase product from the different self-service devices, thereby facilitating multiple purchases by the customer and reducing transactional charges to the owner.

In addition, the present system 100 preferably has the secondary dispenser 20 located adjacent to the primary dispenser 10, thereby promoting consumer impulse buying. The system 100 is entirely self-service and individual purchasing transactions do not need interaction between the customer and attendant.

Although the present invention has been described as integrating payment by cash, credit or charge card, the system can also be used for payment by any acceptable monetary equivalent. In addition, although the present invention has been described for use where there are a plurality of different dispensers 10, 20, the invention can further incorporate the dispensers into a single machine that dispenses different product, such as a fuel dispenser that also dispenses vending machine items.

The foregoing descriptions and drawings should be considered as illustrative only of the principles of the invention. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

I claim:

1. A collective payment and control system for use at a service station comprising:
    a primary dispenser at the service station for dispensing at least a primary product, said primary dispenser retaining inventory information indicating the amount of primary product at said primary dispenser;
    a secondary dispenser at the service station for dispensing at least a secondary product, said secondary dispenser connected to said primary dispenser, said secondary dispenser retaining inventory information indicating the amount of secondary product at said secondary dispenser;
    a primary processor included in said primary dispenser to control the primary and secondary dispensers to respectively dispense the primary and secondary product in response to an input from the customer;
    a local controller at the service station connected to at least one of said primary dispenser and said secondary dispenser; and
    a central controller remote from the service station and connected to the local controller, said central controller receiving the inventory information about at least one of said primary and secondary dispensers directly from one of the primary dispenser, the secondary dispenser, or via the local controller, and dispensing primary or secondary product to the service station based upon the inventory information.

2. The system of claim 1, said primary dispenser having a display device to display advertising information to the customer.

3. The system of claim 1, said primary dispenser having a display device to display sales information to the customer.

4. The system of claim 1, said primary dispenser further comprising a primary payment receptacle, wherein said primary processor determines a total price of all primary and secondary product dispensed by said primary and secondary dispensers for a single financial transaction to said primary payment receptacle.

5. The system of claim 4, wherein said primary payment receptacle accepts cash or a payment card.

6. The system of claim 1, wherein said primary and secondary dispensers respectively determine a price for the primary and secondary product based upon inventory.

7. The system of claim 1, wherein the local controller receives a control signal from said primary processor and transmits the control signal to a designated secondary processor to control said secondary dispenser.

8. The system of claim 7, wherein said local controller further receives a subtotal sales price from each of said primary and secondary dispensers, determines a total sales price and transmits the total sales price to said primary processor.

9. A collective payment and control system for use at a service station comprising:
    a primary dispenser at the service station for dispensing at least a primary products said primary dispenser retaining inventory information indicating the amount of primary product at said primary dispenser;
    a secondary dispenser at the service station for dispensing at least a secondary product, said secondary dispenser connected to said primary dispenser, said secondary dispenser retaining inventory information indicating the amount of secondary product at said secondary dispenser;
    a primary processor included in said primary dispenser to control the primary and secondary dispensers to respectively dispense the primary and secondary product in response to an input from the customer; and
    a local controller connected to at least one of said primary and secondary dispensers, said local controller receiving inventory information about at least one of said primary and secondary dispensers and requesting primary or secondary product to be delivered to the service station based upon the inventory information.

10. The system of claim 1, said secondary dispenser further comprising a secondary processor to control the primary and secondary dispensers to respectively dispense the primary and secondary product in response to an input from the customer, and a secondary display device.

11. The system of claim 1, wherein said primary processor opens a transaction session upon receiving a customer request by making primary and secondary product available for purchase by the customer.

12. The system of claim 11, wherein said primary processor closes the transaction session following a predetermined timeout period.

13. The system of claim 12, wherein the predetermined timeout period begins upon dispensing primary or secondary product.

14. The system of claim 11, whereby if the customer does not select secondary product within a predetermined time period, then the primary processor makes the secondary dispenser unavailable to the customer.

15. The system of claim 1, wherein said primary dispenser operates according to a first protocol and said secondary dispenser operates according to a second protocol.

16. The system of claim 1, further comprising an attendant station connected to said primary and secondary dispensers, wherein said attendant station determines a total price of all primary and secondary product dispensed.

17. A method of collective payment and control of a primary and secondary dispenser that respectively dispense a primary and secondary product, the method comprising:

displaying information about the secondary product to the customer at the primary dispenser;

receiving a customer input at the primary dispenser;

determining inventory information for the secondary dispenser that indicates an amount of secondary product at the secondary dispenser;

establishing a price for the secondary product based upon the determined inventory information; and, controlling, at the primary dispenser, operation of the secondary dispenser in response to the customer's input.

18. The method of claim 17, further comprising determining, at the primary dispenser, a total sales price for all primary and secondary product purchased by the customer and accepting payment from the customer.

19. The method of claim 18, wherein payment is made by a charge card.

20. The method of claim 17, wherein the displayed information is advertising or sales information.

21. The system of claim 9, said primary dispenser determining a total sales price of product dispensed by said primary and secondary dispensers and accepting payment from the customer for the total sales price.

22. The system of claim 9, said primary dispenser having a display device for displaying information to the customer.

23. The system of claim 9, wherein said primary dispenser accepts cash or payment card.

24. The system of claim 9, wherein said primary and secondary dispensers respectively determine a price for the product based on inventory.

25. The system of claim 9, said secondary dispenser controlling the primary and secondary dispensers to respectively dispense product in response to an input from the customer.

26. The system of claim 9, wherein said primary dispenser opens a transaction session upon receiving request by making product available for purchase by the customer form each of the primary and secondary dispensers.

27. The system of claim 26, wherein said first processor closes the transaction session following a predetermined timeout period.

28. The system of claim 27, wherein the predetermined timeout period begins upon dispensing product from the first or second dispenser.

29. The system of claim 27, whereby if the customer does not select product from the second dispenser within a predetermined time period, then the first dispenser makes the second dispenser unavailable to the customer.

30. The system of claim 9, wherein the information comprises any one of sales information, maintenance information, inventory information and present use information.

31. The system of claim 9, wherein the information comprises any one of sales information, maintenance information, inventory information and present use information.

32. A collective payment and control system comprising:

a primary dispenser for dispensing at least a primary product;

a secondary dispenser for dispensing at least a secondary product;

a primary processor included in said primary dispenser to control the primary and secondary dispensers to respectively dispense the primary and secondary product in response to an input from the customer; and, a secondary processor included in said secondary dispenser to control the secondary and primary dispensers to respectively dispense the primary and secondary product in response to input from the customer.

33. The method of claim 17, further comprising the step of determining whether the secondary dispenser needs servicing based upon the inventory information.

34. The system of claim 9, further comprising a central controller remote from the service station, said local controller transmitting a request for primary or secondary product to said central controller and said central controller dispensing product to the service station in response to the request.

35. A collective payment and control system for use at a service station comprising:

a primary dispenser at the service station for dispensing at least a primary product, said primary dispenser generating a service request signal;

a secondary dispenser at the service station for dispensing at least a secondary product, said secondary dispenser connected to said primary dispenser, said secondary dispenser generating a service request signal; and, a controller in communication with at least one of said primary and secondary dispensers, said controller receiving the service request signal from at least one of said primary and secondary dispensers and requesting service for the service station based upon the received service request signal.

36. The system of claim 35, wherein the service request signal of the primary dispenser indicates that additional primary product is needed, and the service request signal of the secondary dispenser indicates that additional secondary product is needed, and said controller requests that product delivery service be made to the service station based upon the received service request signal.

37. The system of claim 36, wherein the service request signal of the primary dispenser indicates that the primary dispenser requires repair and the service request signal of the secondary dispenser indicates that the secondary dispenser requires repair, and said controller requests that repair service be made to the service station based upon the received service request signal.

* * * * *